SCANNING AND TRANSLATING APPARATUS

Filed Nov. 12, 1965 2 Sheets-Sheet 1

INVENTORS
HANS A. MAUCH
GLENDON C. SMITH

BY Jerome P. Bloom
ATTORNEY

INVENTORS
HANS A. MAUCH
GLENDON C. SMITH

BY Jerome P. Bloom
ATTORNEY

United States Patent Office 3,531,770

Patented Sept. 29, 1970

3,531,770

SCANNING AND TRANSLATING APPARATUS

Hans A. Mauch and Glendon C. Smith, Dayton, Ohio, assignors to Mauch Laboratories, Inc., Moraine, Ohio, a corporation of Ohio Filed Nov. 12, 1965, Ser. No. 507,308
Int. Cl. G06k 9/12
U.S. Cl. 340—146.3 11 Claims

ABSTRACT OF THE DISCLOSURE

Apparatus for scanning and translating discrete objects into identifying signals including a screen and means for projecting the image of an object scanned onto the screen while providing for relative movement therebetween and characterized by means in connection with the screen rendered operative at spaced intervals under the influence of successive portions of the image to measure electrically the instantaneous light values of each of said portions, the intervals being controlled by the configuration and the relative movement of the object scanned. There are further means for receiving and storing the results of each successive measurement functioning to summarize the interim results and in conclusion to release an identifying signal predicated thereon when the scanning of an object is complete.

Figure 1:
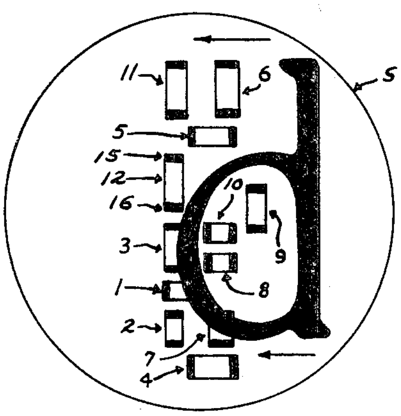

This invention relates to an improved system and apparatus for scanning and translating an object scanned into electrical signals which define the object. A preferred embodiment provides a novel reading machine capable of sensing print, indicia, impressions, graphic representations, and the like and transmitting definitive signals which may be translated in audible form, for example by apparatus such as evidenced in U.S. Letters Patent Ser. No. 3,175,038 issued to Hans A. Mauch.

For purposes of illustration and not with the intention of limiting the nature or character of its embodiment or application, the invention will be described as incorporated in a type reading machine which is enabled thereby to more effectively read upper case and lower case letters and ligatures of nine or more different type styles. On considering this description, those versed in the art will readily recognize that the invention system and its components have other mutual and independent applications which lie within the scope and contemplation of the present invention.

Previously developed reading machines have been generally complex in structure, expensive to fabricate, and their sensing abilities, particularly in respect to the illustrated application, highly dependent upon the size of characters or other objects sensed and their position relative to the included scanning device. It has been a characteristic of such machines that a change of the style or type font of the character scanned requires a change in templates or programming instructions. As a result, the prior art reading machines are generally limited in application to scanning specially designed type styles. This is not so in the case of the invention machines.

The present invention overcomes major problems that have confronted the developers of the reading machine art. Embodiment thereof provides a simple sensing screen which utilizes photo-conductive areas arranged in such a manner that their geometric properties render them capable of compensating for variations in the size, style, and positioning of the scanned objects as well as the contrast between such objects and the surrounding areas. The invention also provides a character recognition logic system whereby a multiple "snapshot" is taken of each character or other object scanned. This further compensates for variation in character width and style and the speed at which the character is scanned.

It is a primary object of the invention to provide sensing and translation systems, and components thereof, which are economical to fabricate, more efficient and satisfactory in use, adaptable to wide variety of applications and relatively free of malfunction problems.

Another object of the invention is to provide apparatus for scanning indicia, print, impressions, graphic representations and the like and converting them into signals utilizing a unique multiple "snapshot" technique.

A further object of the invention is to provide an improved sensing and translation system including means for sensing of an object based on a number of features of said object which are two-dimensional in character and translating such features into an identifying signal.

An additional object of the invention is to provide a scanner unit including sensing means which produce electrical signals corresponding faithfully to prominent features of objects or characters scanned even though the style, size, or positioning of the characters may vary from a desired optimum.

A further object of the invention is to provide scanning and translating apparatus operative to identify and translate a character scanned irrespective of whether said character is scanned at a very low rate or at a very rapid rate or whether the scanning rate varies within the bounds of the character.

Another object of the invention is to provide scanning and translating apparatus possessing the advantageous structural features, the inherent meritorious characteristics and the means and mode of operation herein described.

With the above primary and other objects in view which will more fully appear from the following specification, the invention intended to be protected by Letters Patent consists of the features of construction, the parts and combinations thereof and the mode of operation hereinafter described or illustrated in the accompanying drawings, or their equivalents.

Referring to the drawings wherein a preferred but not necessarily the only form of embodiment or application of the invention is shown, FIGS. 1 to 4 respectively show schematic diagrams of the scanner screen embodied in the scanning and translating apparatus of the invention, which screen utilizes a preferred arrangement of photoconductive areas. The respective views show successive "snapshot" positions of a lower case letter "d" as the image thereof moves across the screen in the process of being scanned; and FIG. 5 is a partial schematic of the electrical circuitry operatively related to the screen of FIGS. 1–4.

Like parts are indicated by similar characters of reference throughout the several views.

The invention can be best described with particular reference to the embodiment shown in the accompanying drawings. Only such structure is illustrated as appears essential to a complete understanding of a reading machine in accordance with the present invention.

In this instance, the machine includes a screen S which embodies an array of photocells particularly suited for sensing upper and lower case letters and ligatures of the type and style most commonly used in current American books, newspapers, and typewritten matter.

Conventional apparatus is employed to transmit the character or other object images to the screen. In the example illustrated, for reading printed characters on an opaque surface, one or more light sources illuminate the scanned area while a lens receives and projects an image of the observed character on the screen in an inverted form. The screen is also inverted to correct for the lens effect. The scanning motion may be obtained by any suitable means which may provide either for movement of the scanned object or the scanner.

To facilitate an understanding of the invention, however, the drawings show the upright position of the scanned character and indicate the character in its particular relation to the sensing components of the screen S.

As may be seen in FIGS. 1–4 of the drawings, the sensing components comprise photocells, respectively identified by the numerals 1 to 12. The cells are of the photoconductive type such as those commercially available which are made of cadmium selenide. Properly prepared surfaces of this material exhibit a low electrical resistance when exposed to a moderate light level and a high electrical resistance when exposed to a dark object or surface. The cells are arranged to form a predetermined geometric pattern of photoconductive areas on the screen S. Noting the cell 12, for example, this cell is vertically oriented and has one electrical connection to its top 15 and another to its bottom 16. These electrodes as well as those of other cells, are identified by heavy lines. While some of the cells such as 12 are vertically oriented, others are horizontally oriented and have their electrodes at their lateral extremities. The basic consideration is that to most effectively sense the critical characteristics of the horizontal features of an object or character scanned, one should use vertically extended cells. On the other hand, for sensing critical characteristics of vertical features of a scanned object, one should use horizontally extended cells. Generally speaking, the preferred orientation of a cell is perpendicular to the letter feature to be sensed. By using cells of this nature and providing that their exposed photo-conductive areas are directionally oriented, the invention apparatus achieves an optimal and most flexible sensing capability by producing a high resistance area on the photocell surface electrically in series with the remaining low resistance photocell areas. Thus, the high resistance area produced by the dark character feature tends to interrupt the current flow and the net effect on the total resistance, electrode to electrode, is greater than would be the case if the high resistance dark area were parallel to the direction of current flow, and a continuous low resistance illuminated area would exist on that photocell from electrode to electrode. By using this effect, the machine performs well with letters which are above or below the optimum scanning level, or which are not magnified to the exact size desired, or which are of different type styles. The multiple "snapshot" process described below further increases the range of character styles which can be read by the machine described.

In practicing the invention, it contemplates the use of key cell means to trigger a series of spaced "snapshots" as the image of a character is being scanned. Each snapshot result is electrically transmitted and stored in memory devices and, upon a terminal signal, the composite of the multiple snapshots is released in a manner to specifically translate the image scanned into an identifying electrical signal.

In the invention system not all cells on the screen S are utilized in reference to each character or object that may be scanned. The specifically concerned cells in reference to each possible character to be considered are determined by the particular electrical circuitry connecting them into the wiring of a recognition matrix 30, the use of which will be further described. For example, in recognizing the letter "d" illustrated during a scanning process, we are concerned in this embodiment only with the condition of cells 1, 2, 3, 5 and 12. Specifically, in the recognition matrix here utilized, at the first snapshot position (FIG. 1) cells 1 and 5 are critical; in the second (FIG. 2) cells 1, 12 and 3; in the third (FIG. 3) cells 1, 5 and 2; and finally, in the fourth (FIG. 4) only the key cell 1. In the recognition procedure cell 1 is in all instances the key cell and a change in its condition is a prerequisite to the taking of an electrical snapshot.

Referring to FIG. 5 of the drawings, only those circuit elements are shown which are essential to describing the recognition process using the example of the character "d." An operational description thereof should suffice for a clear understanding of the invention. Photocells 1 through 12 inclusive are each connected in series with a resistor and supply voltages to form a simple voltage divider. Taking photocell 12 as an example, the output voltage at the resistor-photocell junction is amplified by a direct coupled amplifier 20 and passes through a frequency compensation network 21 which serves to emphasize higher frequencies and to compensate for the decrease in photocell signal strength as characters are scanned at more rapid rates. From the frequency compensation network 21, the photocell signal enters a decision unit 22. This produces either a unit voltage, the binary 1, if the photocell resistance is above a certain present value $R_{12}$, or produces zero volts, the binary 0, if the photocell resistance is below the preset value $R_{12}$.

The decision unit 22 may be a Schmitt trigger circuit. In such event, relative to the exact preset value $R_{12}$ at which switching occurs, it will exhibit a small amount of hysteresis in switching from the binary 1 to the binary 0 and vice versa. If the magnitude of this hysteresis is correctly proportioned relative to the variations in photocell resistance, as a typical character is being scanned, the presence of hysteresis in the decision unit will reduce undesired switching of the decision unit output due to noise at the input to the unit without adversely affecting the snapshot recognition process.

The switching point of each decision unit is adjusted so that the binary 1 will be produced when the corresponding photocell is sensing the type of character feature which the photocell is intended to sense. The switching will normally occur when the photocell resistance is about 10% to 30% higher than that resistance obtained when the photocell is sensing a white or light background over its entire surface.

To understand the snapshot process, reference is made first to FIG. 1 of the drawings. There shown is the dark image of the example letter "d" as the image, during a scanning procedure, starts to first cover the narrow end of the key cell 1. With the advance of the image over that photocell, the total resistance thereof increases. When about 10% of the photoconductive surface of the cell 1 is covered by the image, the increase in its resistance is such that the resultant signal through the amplifier 23 and frequency compensation network 24 to its decision unit 25 causes the unit 25 to produce a binary 1. The unit 25 is connected to a differentiator rectifier circuit 26 which converts the change of state signal into a pulse of uniform polarity and transmits it to an electronic counter 40 to produce an output from its first terminal 41.

Counter 40 has, in this instance, six output terminals, respectively identified as 41 to 46. In accordance with the nature of the counter, each time it receives a pulse indicating a change in condition of the key cell 1, it produces an output voltage at a succeeding terminal. Each output terminal of the counter connects to a differentiator circuit (51, 52, etc.) which, on receipt of a change of state signal from the counter, produces a short pulse the result of which will be further described. Returning to the illustration of the "d" image as shown in FIG. 1 of the drawings, as described, when 10% of the key cell 1 is covered by the dark image, a change of state signal issues from the terminal 41 of the counter. This is the instant of the first "snapshot." It will be seen with reference to FIG. 1 that all other cells sense white except the cells 3 and 7. This causes the associated decision units of the latter cells to produce a binary 1. Looking to the drawings, when a signal appears at the counter terminal 41, the related differentiator circuit 51 produces a short pulse to a number of "AND" circuits, only three (61, 62, 69) being shown for simplicity of disclosure. While the cells 3 and 7 may be sensing black at the time of this first snapshot and may produce a binary 1 from their decision circuits, and the cell 3, for example, may cause the "AND" circuit 62 to transmit a signal to a memory storing unit 162, nevertheless, the output of the memory unit 162 serves no purpose, in this instance. The recognition matrix 30 is so wired, in respect to sensing an element of "d" at the first snapshot position, that it is only concerned, outside of the reaction of key cell 1, with the condition of the cell 5. For a recognition of the "d" the cell 5 must be sensing light at the time of the first snapshot, in which event it produces a binary 0 by means of its associated circuits 57, 58, 59. This binary 0 is transmitted to "AND" circuit 69 (and others not shown), where it, in combination with the first snapshot pulse from differentiator 51, produces a binary 0. This signal is stored in the associated memory unit 169 which in turn feeds it into matrix 30.

Accordingly, at the first snapshot position the important factors in the recognition procedure here described are the first actuation of the counter 40 evidencing a change in condition of the key cell 1, and the fact that the state of the resistance of the cell 5 indicates the absence of a riser in the first snapshot position of the letter "d."

Figure 2:
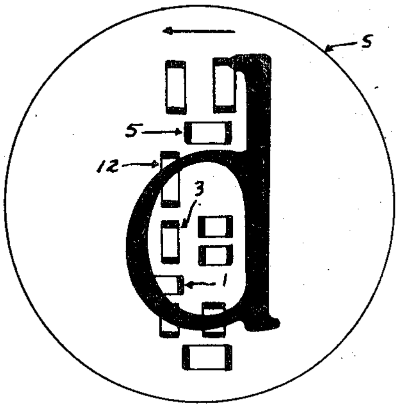

The second snapshot position of "d" is shown in FIG. 2 of the drawings. This snapshot occurs the instant the image of the "d" uncovers key cell 1 to the extent that less than 10% of this cell senses dark. In accordance with the wiring of the recognition matrix 30, to recognize the "d," we are here concerned with the conditions of cells 3 and 12. It is essential that the cell 3 here senses light and transmits a binary 0 to its associated "AND" circuits 62, 72, 122 and others not shown. On the other hand, to ascertain a sensing of the "d" the cell 12 must be sensing the critical horizontal features of the "d" and correspondingly transmit a binary 1 to its associated "AND" circuits 79, 129 and others not shown. At the same time the electronic counter 40 receives the signal indicating the change in state of the key cell 1 and, as a result thereof, produces an output at its second terminal 42 and a corresponding pulse from differentiator circuit 52 to "AND" circuits 71, 72, 79 and others not shown. Evidently, only "AND" circuits 72 and 79 receive simultaneous pulses from two sources and transmit signals to their associated memory units 172 and 179.

Memory unit 179 transmits a binary 1 output to the recognition matrix, evidencing that cell 12 has seen critical horizontal features at its particular snapshot location referenced to the letter "d." Likewise, memory unit 172 transmits a binary 0 output to the recognition matrix evidencing that cell 3 has seen white at its particular snapshot location referenced to the letter "d."

Figure 3:
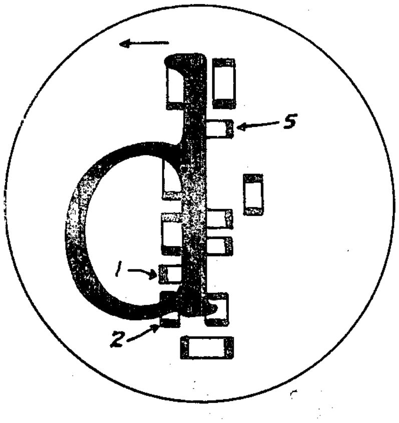

The third snapshot position is shown in FIG. 3 of the drawings. This occurs the instant the key cell 1 once more has more than 10% of its photoconductive exposed surface covered by the dark of the image. At this point the output of the cell 1 changes to activate the counter as previously described to produce an output signal at its third terminal (not shown). In accordance with the wiring of the rceognition matrix, the critical cells at this point are 5 and 2. For transmitting an indication for the recognition of a "d" at this point, as seen in the drawings, both cells must sense the dark of the image. The cell 2 senses a critical horizontal feature and the cell 5 senses a critical vertical feature of the character. Accordingly, there is produced a binary 1 from the decision unit related to each of the cells 2 and 5 which is reflected in a manner and through means as previously described to store appropriate signals in corresponding memory units, an electrical interconnection being had through "AND" circuits which are interconnected with the output from the third terminal of the counter 40. The memory units related to the appropriate "AND" circuits in the instance of the third snapshot then store the information and produce a corresponding output directed to the recognition matrix.

Figure 4:
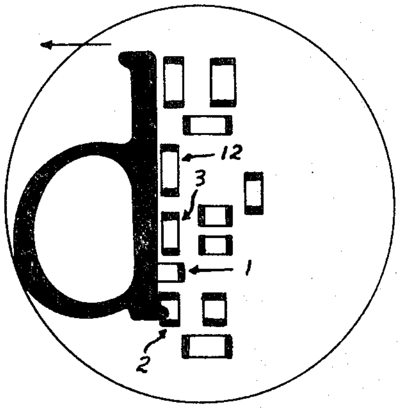
Figure 5:
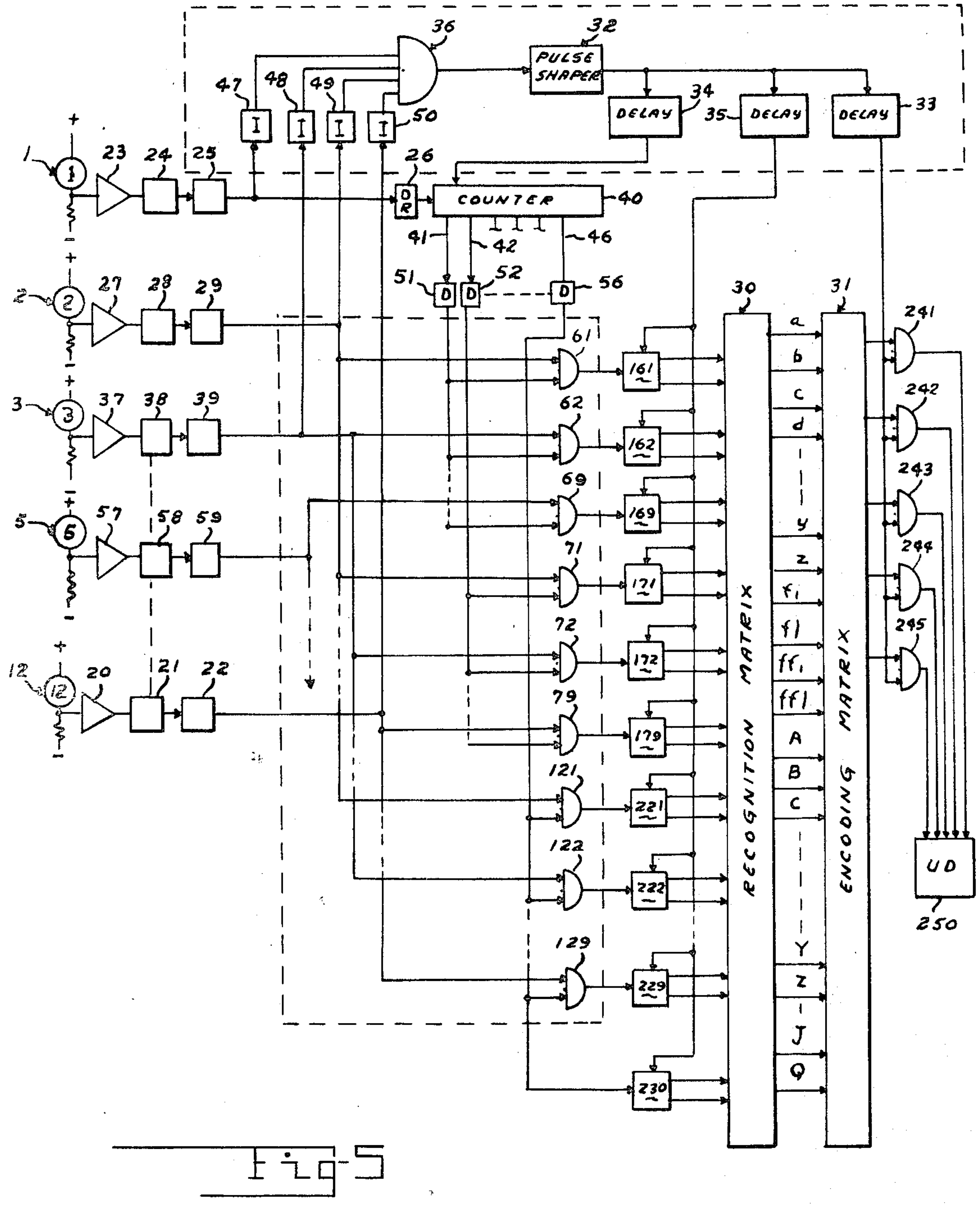

The fourth and final snapshot position, in this case, is seen in FIG. 4 of the drawings. At this point, the cell 1 again senses light, the change in condition being reflected by the counter 40 at a fourth terminal which serves to produce an output as previously described. For the final snapshot in the case of the "d," this is the only critical fact and no other photocells are involved.

The occurrence or non-occurence of a snapshot may be made of made of record, as seen in FIG. 5 of the drawings. Memory units such as 230 may be connected, for example, to any of the differentiator circuits 51–56 (56 shown). Depending on whether or not this memory unit is energized there is evidence that the particular snapshot represented by the particularly associated counter output terminal has or has not been taken, yielding information regarding the lateral structure of the letter scanned.

It is noted that the memory units as employed in the illustrated embodiment may incorporate any of a wide number of bistable devices including tunnel diodes, four layer diodes, gas discharge lamps or multivibrator circuits. Each memory unit in the preferred embodiment has an assertion and negation output, an input capable of changing the status of the outputs and a reset input terminal which returns the memory unit to its original condition when a voltage pulse is applied to said reset input terminal.

The assertion and negation outputs of all the memory units in the described embodiments are applied to the recognition matrix 30. The matrix 30, as previously indicated, decodes the memory units contents into one of the characters the machine can recognize by comparing the memory contents, for example, with the locations of diodes or other devices at selected intersections of the memory assertion and negation wires with wires in the matrix representing characters recognized. Such a matrix is believed well understood by those versed in the art. The rceognition matrix can be designed so that the characters other than "d" provided for in the matrix utilize only memory units which contain reliable data and so that only one output wire of the recognition matrix remains energized at the end of a letter.

To generate an end-of-letter signal, there is an "AND" circuit 36 which is connected through inverter circuits 47, 48, 49 and 50 to the output of decision units 25, 29, 39 and 22 respectively associated with cells 1, 2, 3 and 12. At the first instant, when during the scanning of a letter the cells 1, 2, 3 and 12 all sense light indicating the end of that letter, the pulse circuit 32 connected to the ouput of the "AND" circuit 36 produces a short pulse. This pulse is applied to three delay circuits 33, 34 and 35. The function of these delay circuits will be further described.

While throughout the scanning procedure memory units pertinent to recognition of a character are storing signals transmitted from the photocells, they are also producing an output directed to the recognition matrix. Theerfore, at each successive snapshot the input to the matrix 30 will fluctuate. Simultaneously, the output of the matrix also fluctuates. In the end result, at the time of the end-of-letter signal, the matrix output has only one wire energized. This produces the identifying signal. In the case illustrated, it would be that of "d." Of course, there is another output wire for the capital "D" and there may be duplicate outputs not only for identical upper and lower case letters but for letters which appear in two or more widely varying styles such as "J" and "Q." In all these cases the multiple identical letters are treated as different letters in the recognition matrix 30 and then combined by means such as "AND" circuits. Therefore, one could, in a great majority of applications, take these combined outputs of the recognition matrix directly to a utilization device such as that of the previously mentioned Mauch Pat. 3,175,038.

In the case of the preferred embodiment illustrated, however, it is also contemplated that upper and lower case letters may have separate output wires and that such may be combined in an encoding matrix 31 and converted into a common binary code, such as the five bit Baudot code. This permits exceptions to utilizing only one output wire from the recognition matrix at an end-of-letter signal. Encoding matrix 31 can provide means, for example, to tolerate that when a lower case "k" is scanned both upper case "K" and small "k" output wires from recognition matrix 30 may be energized at the same time. This can be handled by encoding matrix 31 without changing the signals received by a signal utilizing device and facilitates the handling of widely different type styles.

We now return to consideration of the delay circuits 33, 34 and 35. As described, the inputs and outputs of both the recognition matrix 30, and the encoding matrix 31 are active and fluctuating during scanning of the character "d." The end-of-letter pulse, from pulse circuit 32, delayed in time slightly by delay circuit 33, is applied to one input each of five "AND" circuits 241–245 each of which has one output wire of the encoding matrix 31 as the other input. The encoding matrix provides that the five bit binary code representative of the character scanned will be present at the appropriate output wires of the encoding matrix for a small fraction of a second shortly after the character has been scanned. This insures that as the end-of-letter pulse is transmitted to the "AND" circuits 241–245, the proper information is relayed to the utilization device 250.

After a slightly longer delay, the end-of-letter signal appears at the output of delay 34 and enters the counter circuit 40 which is reset thereby to a zero count. Shortly thereafter the delayed end-of-letter signal coming from delay unit 35 is applied to the reset terminals of all the memory units. This causes all the memory units which have stored dark to be reset to storing light. Those units which are in a storing light or white state are unaffected by the end-of-letter signal.

Since the end-of-letter pulse could coincide with the snapshot, the end-of-letter pulse is delayed slightly by delay 33 before it permits the character signal to enter the utilization device 250. The delay allows the memory units time to store the information gathered by the last snapshot and allows time for this information to affect the outputs of recognition matrix 30 and encoding matrix 31.

Note that the duration of the end-of-letter pulse plus the longest of the three delays, delay 35, is such that the total time is less than the time the photocells need to sense a space between letters, even at a very high charater reading rate. This is a necessary condition to be certain that the counter 40 and all memory units are ready to take snapshots when the leading edge of a succeeding character darkens a small part of photocell 1 as previously described.

In the case of the described embodiment, the present invention utilizes feature sensing photocells of such design that the information from one photocell is often sufficient to determine the presence or absence of character features of interest.

A further fact to be noted is that all the "AND" circuits 61–129 together, as shown in FIG. 5, and others not shown, may be considered to represent a matrix performing the function of encoding the sensing of the photocells into the form of continuing signals representative of features of characters scanned, which signals are stored in the memory units.

Accordingly, it may be seen that the invention achieves a unique and highly accurate method of defining a scanned character. It must be kept in mind that the number of snapshots actually taken during a scan of a single character or object is determined by the critical features of the character. The time spacing of the snapshots is determined by the scanning speed and by the spacing of character features which intersect cell 1. This allows the same sensing and storing procedure to take place in the scanning of a narrow typewritten "m" as in the scanning of a wide book type "m."

In summary, the invention system can be used with or without the encoding matrix in a manner believed obvious. The encoding matrix is desired for the most sophisticated applications and as an added safety factor in transmitting the correct signals to a utilization device.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described our invention, we claim:

1. Apparatus for scanning and translating images of individual characters scanned, comprising, photosensitive means disposed in a geometric pattern, means for presenting each character image to the photosensitive means while providing a relative motion therebetween, means in connection with said photosensitive means for transmitting a light value signal each time their light sensitive surface senses a predetermined portion of the character image being scanned, means controlled by the light value signals transmitted by said photosensitive means from at least one suitably predetermined key portion of the character image to control in turn the successive selection of light value signals transmitted by the photosensitive means from other character image portions, means for storing the successive light value signals of a character image scanned, and means operative on completing the scanning and the selecting of light value signals to produce a summary signal indicative of the individual character image scanned.

2. Apparatus for scanning and translating discrete characters scanned into identifying signals comprising a screen, means for projecting the image of each individual character scanned onto said screen while providing for relative movement therebetween, means in connection with said screen rendered operative at spaced intervals by successive portions of the image of the individual character being scanned to measure electrically the instantaneous light values of each said successive portion of the relatively moving image, said last mentioned means providing that the intervals at which said measurements are taken are controlled by the configuration and relative movement of the character scanned, and means for receiving and storing the results of each successive one of said electrical light value measurements taken in respect to the individual character being scanned, said last mentioned means being operative to summarize said results and to transmit and release an identifying signal, predicated thereon, when the scanning of an individual character is complete.

3. Scanning and translating apparatus as in claim 1 characterized by said means in connection with said screen including a plurality of photo-cells having light-sensitive areas exposed on said screen in a spaced, geometric pattern, at least one of the cells functioning as a key cell by having means in connection therewith controling the intervals at which said electrical light value measurements are taken in correspondence with the changing configuration of the successive portions of the image exposed to said photocells as the image is relatively moved thereby in the scanning procedure.

4. Scanning and translating apparatus as in claim 1 characterized by said receiving and storing means including, in connection therewith, matrix means arranged to produce the identifying signal by routing therethrough certain signal or signals deriving from said electrical light value measurements.

5. Scanning and translating apparatus as in claim 1 wherein said intervals at which the electrical light value measurements are taken are controlled by light-sensitive means exposed on said screen and arranged to sense the changing configuration and the relative movement of selected portions of the image of the character scanned in the course of the relative movement between the image and the screen.

6. Scanning and translating apparatus as in claim 5 characterized by said light-sensitive means consisting of photo-conductive signal means exposed on a key area of said screen and having means in connection therewith controlling the taking of said electrical light value measurements in correspondence with predetermined changes in its conductivity as induced by the movement of different portions of said image over said key area of said screen.

7. Scanning and translating apparatus as in claim 1 having particular application to scanning graphic characters and the like, characterized by a plurality of photo-cells mounted to form a geometric pattern of exposed photo-conductive sensing areas on said screen for taking said electrical light value measurements, each of said photoconductive sensing areas being directionally oriented to respectively function in reference to particularly oriented critical features of said graphic characters, and a portion of said photo-conductive areas functioning to control the successive intervals within the scan of a character at which said electrical light value measurements are to be taken.

8. Scanning and translating apparatus as in claim 1 characterized by said means in connection with said screen including a plurality of photo-cells having photo-conductive areas which are exposed on said screen in a geometrically spaced pattern, at least some of said exposed areas being oriented to extend in a vertical sense to sense and transmit signals of critical horizontal features of an image sensed and others being oriented to extend in a horizontal sense to sense and transmit signals of critical vertical features of the image sensed on said screen.

9. Scanning and translating apparatus as in claim 8, at least one of said cells being a key cell operative on each successive predetermined change therein during the scanning of a character to signal the time for taking the electrical light value measurements of the portion of the image being scanned at that instant.

10. Scanning and translating apparatus as in claim 1, characterized by said means in connection with said screen including a selected group of photocells arranged so that they will simultaneously sense a light value change representative of an open space following a character and produce a combined signal thereof when the scanning of a character is complete, said combined signal being operative to trigger said release of said identifying signal.

11. Apparatus particularly advantageous for scanning and identifying images of individual characters, indicia, and other objects of graphic form in the course of the scanning comprising a plurality of spaced photo-cell presenting light-sensitive surfaces arranged in a grouped geometric pattern, means in connection with each photo-cell for producing a light value signal each time a part of its light-sensitive surface senses a predetermined portion of an image being scanned, at least one of said cells functioning as a key cell by having in connection therewith means producing a control signal each time its condition changes as a result of successively sensing predetermined key portion of said image as it is relatively moved thereby during scanning, memory devices selectively connecting with said light value signal producing means in correspondence with said control signal producing means and arranged to selectively store light value signals transmitted from said photo-cells which exist at the precise moment each of said control signals occurs, and means for releasing the total of the stored light value signals, representing sensing of successive portions of the image, when the scanning of an individual character is complete to produce a signal specific to the image scanned, said photo-cells being of the photo-conductive type and directionally oriented so selective cells are used to signal particularly critical features of an image scanned, said selective cells being generally oriented to extend crosswise over said critical features.

References Cited

UNITED STATES PATENTS

| | | | |
|---|---|---|---|
| 2,925,586 | 2/1960 | Levy | 340—146.3 X |
| 3,229,252 | 1/1966 | Reumerman | 340—146.3 |
| 3,245,037 | 4/1966 | Brust | 340—146.3 |
| 3,297,993 | 1/1967 | Clapper | 340—146.3 |
| 3,370,271 | 2/1968 | Van Dalen | 340—146.3 |
| 3,201,751 | 8/1965 | Rabinow | 340—146.3 |

MAYNARD R. WILBUR, Primary Examiner

L. H. BOUDREAU, Assistant Examiner